(12) United States Patent
Hebert et al.

(10) Patent No.: US 10,209,682 B1
(45) Date of Patent: Feb. 19, 2019

(54) AUTONOMOUS TRACTION MEASUREMENT OF A SURFACE

(71) Applicant: Amazon Technologies, Inc., Seattle, WA (US)

(72) Inventors: Gabriel Hebert, Waltham, MA (US); Oliver Christoph Purwin, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/917,241

(22) Filed: Mar. 9, 2018

(51) Int. Cl.
*G06F 7/00* (2006.01)
*G05B 13/00* (2006.01)
*G05D 1/02* (2006.01)
*B66F 9/06* (2006.01)

(52) U.S. Cl.
CPC .............. *G05B 13/00* (2013.01); *B66F 9/063* (2013.01); *G05D 1/0234* (2013.01); *G05D 2201/0216* (2013.01)

(58) Field of Classification Search
None
See application file for complete search history.

(56) References Cited

U.S. PATENT DOCUMENTS

| 8,280,547 | B2 | 10/2012 | D'Andrea et al. |
| 9,087,314 | B2 | 7/2015 | Hoffman et al. |
| 2017/0036349 | A1* | 2/2017 | Dubrovsky ........... B43L 13/022 |
| 2018/0050634 | A1* | 2/2018 | White ................... A47L 7/0085 |

* cited by examiner

*Primary Examiner* — Yolanda R Cumbess
(74) *Attorney, Agent, or Firm* — Kilpatrick Townsend & Stockton LLP

(57) ABSTRACT

Embodiments are directed to an inventory system having one or more drive units that are used, in part, to measure traction of a surface. Traction of the surface may be one of many features that can help with the operation of drive units and may also help avoid collisions between drive units when little room is available between the drive units for navigational errors.

20 Claims, 10 Drawing Sheets

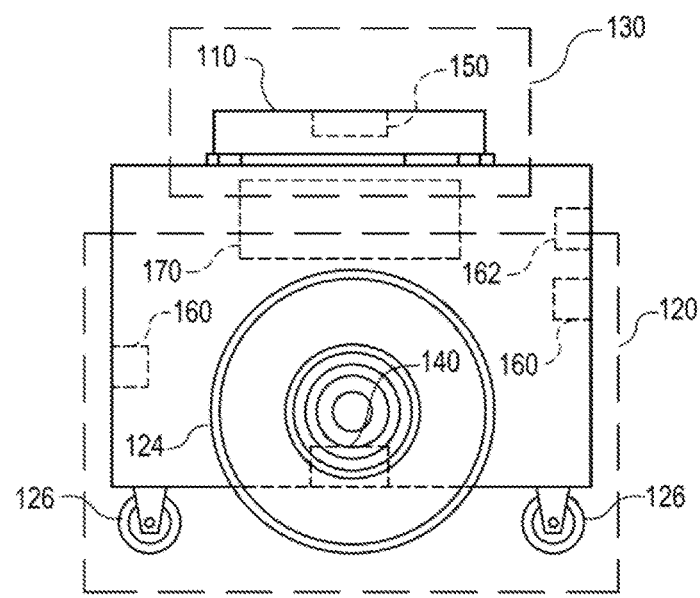
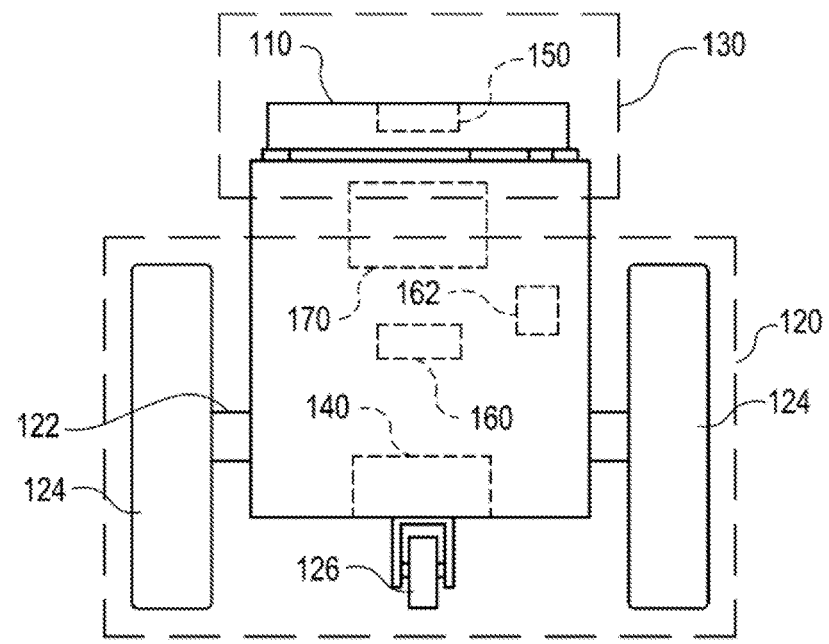
FIG. 4

Example of Data from Traction Test Routine

← 700

| Test Run | Time of Run | Acceleration (rad/s/s) | Max Velocity (rad/s) | Rotation Angle via Encoder (rad) | Rotation Angle via Rotation Gyroscope (rad) | Slip Magnitude (rad) |
|---|---|---|---|---|---|---|
| 1 | 9:28:45 PM | 1.0 | 2.6 | 3.416 | 3.410 | 0.006 |
| 2 | 9:28:51 PM | -1.0 | 2.6 | 3.427 | 3.433 | 0.005 |
| 3 | 9:28:55 PM | 2.0 | 2.6 | 1.702 | 1.695 | 0.007 |
| 4 | 9:28:59 PM | -2.0 | 2.6 | 1.718 | 1.723 | 0.005 |
| 5 | 9:29:03 PM | 3.0 | 2.6 | 1.129 | 1.123 | 0.006 |
| 6 | 9:29:07 PM | -3.0 | 2.6 | 1.150 | 1.158 | 0.008 |
| 7 | 9:29:11 PM | 4.0 | 2.6 | 0.845 | 0.837 | 0.008 |
| 8 | 9:29:15 PM | -4.0 | 2.6 | 0.867 | 0.875 | 0.008 |
| 9 | 9:29:18 PM | 5.0 | 2.6 | 0.670 | 0.661 | 0.009 |
| 10 | 9:29:22 PM | -5.0 | 2.6 | 0.698 | 0.708 | 0.010 |
| 11 | 9:29:25 PM | 6.0 | 2.6 | 0.553 | 0.542 | 0.011 |
| 12 | 9:29:28 PM | -6.0 | 2.6 | 0.586 | 0.599 | 0.012 |
| 13 | 9:29:32 PM | 7.0 | 2.6 | 0.471 | 0.448 | 0.023 |
| 14 | 9:29:35 PM | -7.0 | 2.6 | 0.507 | 0.535 | 0.028 |
| 15 | 9:29:39 PM | 8.0 | 2.6 | 0.408 | 0.346 | 0.062 |
| 16 | 9:29:42 PM | -8.0 | 2.6 | 0.446 | 0.513 | 0.067 |
| 17 | 9:29:45 PM | 9.0 | 2.6 | 0.360 | 0.287 | 0.073 |
| 18 | 9:29:49 PM | -9.0 | 2.6 | 0.400 | 0.477 | 0.077 |
| 19 | 9:29:52 PM | 10.0 | 2.6 | 0.323 | 0.226 | 0.097 |
| 20 | 9:29:55 PM | -10.0 | 2.6 | 0.360 | 0.465 | 0.105 |

Test Runs Below Slip Threshold (runs 1–10)

Test Runs Exceeding Slip Threshold (runs 11–20)

Resulting Acceleration Threshold = ±5.0 (rad/s/s)

Slip Threshold Set at 0.010 (rad)

AUTONOMOUS TRACTION MEASUREMENT OF A SURFACE

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance.

In modern inventory systems that have incorporated robotic devices to assist with inventory related tasks, the process of tracking these robotic devices becomes a complex, technical problem as well. For example, a robotic device may be tracked at a particular location in a warehouse. Physical attributes of the warehouse may hinder the identification of the robotic device, despite several sensors or data used to track the device. As a result, any improved technical changes to functionality of the robotic devices may not be fully realized due to the limitations of physical attributes of the warehouse or inefficient utilization of other processes, limiting the ability of the system to accommodate fluctuations in system throughput.

BRIEF DESCRIPTION OF THE DRAWINGS

Various embodiments in accordance with the present disclosure will be described with reference to the drawings, in which:

FIG. 4 illustrates in greater detail an example mobile drive unit that may be utilized in particular embodiments of the inventory system shown in FIG. 2;

FIG. 7 illustrates wheel encoder data and/or rotation gyroscope data according to an embodiment of the present disclosure;

DETAILED DESCRIPTION

Figure 1:
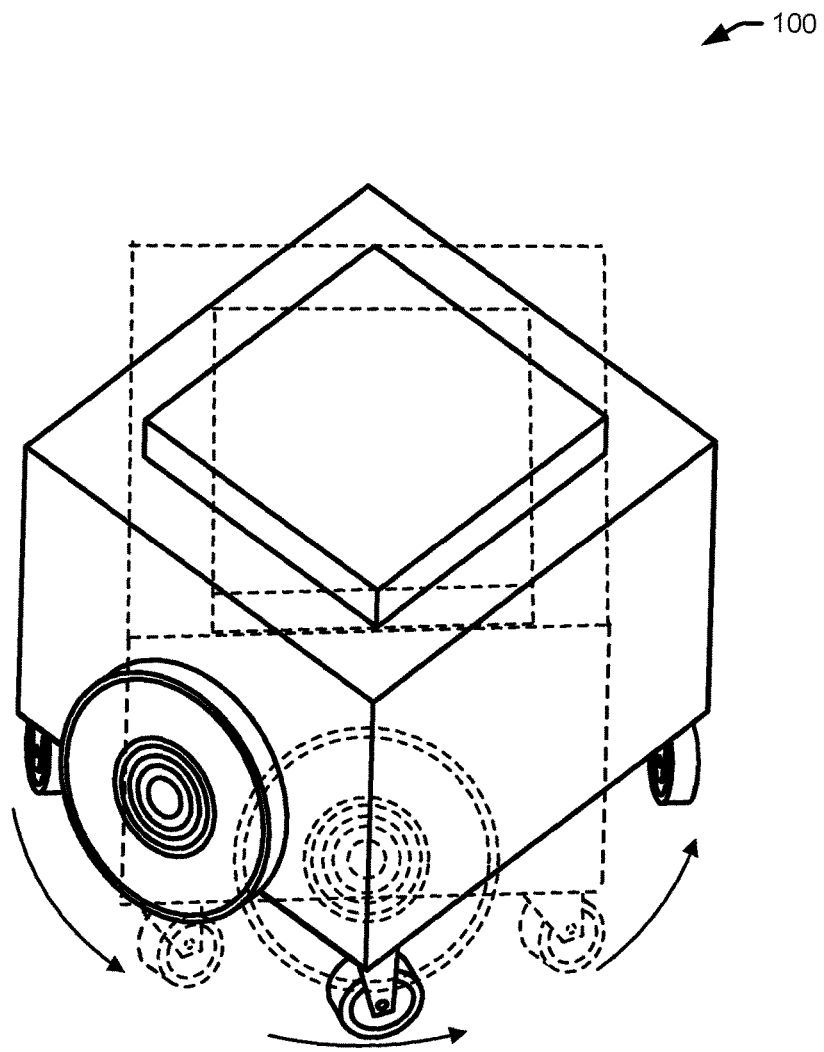
FIG. 1 illustrates a mobile drive unit performing a rotation according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having one or more drive units (or "unmanned mobile drive units," used interchangeably) that are used, in part, to measure traction of a surface. Traction defines the amount of shear force that can be generated between the wheels of a drive unit and the surface the drive unit moves on. Traction of the surface may be one of many features that can help with the operation of drive units in a storage facility and may also help avoid collisions between drive units when little room is available between the drive units for navigational errors. For example, conventional surfaces may be susceptible to dust and wearing down over time. When the drive units traverse the conventional surfaces, the traction between the surface and the wheels of the drive units may be decreased, which causes slip due to the dust and wear of the surface. This is particularly noticeable when the drive unit accelerates or decelerates. One solution to loss of traction may be to limit the acceleration or deceleration of the drive unit throughout the entire surface of the storage facility. However, this may result in a loss of system throughput. Additionally, the loss of traction at any point during the navigation of the drive unit may cause the drive unit to miss a predetermined destination (e.g., a fiducial) and identify an error in the navigation of the drive unit. The error relating to the drive unit may be reviewed by a human user, and when the drive unit is incorporated in an inventory system with a plurality of drive units, any interaction with a human user or increased levels of navigation errors across the inventory system may also lower the performance of the inventory system. In some examples, these errors or interferences may result in a collision with other drive units.

Embodiments described herein may help measure or assess the traction of the surface using the one or more drive units of the inventory system. Specifically, features herein may be directed to measuring the traction of the surface by measuring wheel encoder data from the rotation of wheels of the drive unit and also measuring rotation gyroscope data from a gyroscope sensor of the drive unit. The wheel encoder data and rotation gyroscope data may be compared. Any difference between these two measurements of data (e.g., at a particular point of time) may help to derive an acceleration threshold that maintains traction. For example, the drive unit may be limited to operating below an acceleration threshold in order to avoid exceeding a predetermined slip threshold and potentially losing traction. In response to a derivation of the acceleration threshold, the acceleration or deceleration of the drive unit may be modified accordingly.

In accordance with an embodiment, the drive unit may perform a series of rotations to measure the traction of the surface. In a sample illustration, the drive unit may perform a first rotation relative to the surface during a calibration routine. The calibration routine may accelerate to a constant rate of speed and rotate in a counterclockwise or clockwise direction (e.g., spinning the drive unit at a predetermined value that may be positive or negative, including a predetermined acceleration value or predetermined deceleration value). In some examples, "deceleration" and "negative acceleration" may being used interchangeably. This calibration routine may help synchronize the wheel encoder sensor (e.g., for determining the distance or position) with the gyroscope sensor (e.g., for determining the angular velocity), both of which can be used to measure the rate of rotation of the drive unit, but from two different sensors that are coupled with the drive unit. The drive unit may then perform a series of rotations relative to the surface during a test routine. During the first sequence of the test routine, the drive unit may accelerate at a predetermined value to a constant rate of speed, maintain the speed, and then decelerate at a similar predetermined value. The second sequence of the test routine may perform a similar motion as the first sequence, but with an acceleration and deceleration that are greater than that of the first sequence. The test routine may repeat this sequence, incrementing angular acceleration and deceleration until a predetermined slip threshold is reached. The system may compare and analyze data from the sensors to determine whether the wheels lose traction with the surface, corresponding with a slip threshold. For example, when the wheels of the drive unit slip, the gyroscope sensor may identify that the angular velocity should place the wheels at location A, while the wheel encoder sensor may identify the distance or position of the wheels is at location B. Any difference between data from the two sensors may be identified as a loss of traction at the location, which can be matched to a specific angular acceleration and/or deceleration.

FIG. 1 illustrates a mobile drive unit performing a rotation according to an embodiment of the present disclosure. In illustration 100, the rotation may be performed during a calibration process and/or a testing process. For example, a management module of an inventory management system may instruct the mobile drive unit to perform a rotation relative to the surface. In some examples, the drive unit may initiate the acceleration or deceleration without receiving the instruction from the management module of the inventory management system (e.g., a local instruction to accelerate or decelerate). This may correspond, in some examples, with a predetermined testing procedure at a particular time to test the traction of the surface by the mobile drive unit.

The wheels of the drive unit may perform a movement relative to the surface. As explained in further detail throughout the application, a drive module of the mobile drive unit may initiate the rotation of the drive unit using a motorized axle, a pair of motorized wheels, and a pair of stabilizing wheels, as provided with illustration 100. Placement and function of the motorized wheel, motorized axle, and stabilizing wheel may be further described with FIG. 4.

The rotation of the mobile drive unit may generate wheel encoder data and rotation gyroscope data from components of the mobile drive unit, including a wheel encoder sensor and a gyroscope sensor. These or other sensors may be coupled with the mobile drive unit and correspond with the location of the mobile drive unit as the mobile drive unit traverses the surface of the storage facility. The wheel encoder sensor may generate wheel encoder data to identify speed, distance, or position of the wheel(s).

The wheel encoder sensor may comprise an electromechanical device that converts the angular position or motion of the wheel to an analog or digital signal. The analog or digital signal may be transmitted to the management module via a communication protocol described herein.

The rotation gyroscope sensor (or gyroscope sensor, used interchangeably) may comprise an electronic gyroscope for measuring the angular velocity of the mobile drive unit. The gyroscope sensor may comprise, in some examples, a microelectromechanical systems (MEMS) gyroscope or a mechanical gyroscope where the data are converted to a digital signal and may be transmitted to the management module via a communication protocol described herein.

The movement of the drive unit relative to the surface may correspond with a plurality of operational modes, including a diagnostic mode (e.g., a calibration routine followed by a test routine) and a normal mode of operation (e.g., a calibration routine followed by passive traction monitoring). During the diagnostic mode, the drive unit may perform a first rotation relative to the surface during a calibration routine. The calibration routine may accelerate to a constant rate of speed and rotate in a counterclockwise or clockwise direction. This calibration routine may synchronize the wheel encoder sensor (e.g., for determining the wheel distance or position) with the gyroscope sensor (e.g., for determining the angular velocity of the mobile drive unit), both of which may determine similar measurements of the rate of rotation of the drive unit, but from two different sensors that are coupled with the drive unit.

During the calibration routine, the wheels of the drive unit may be accelerated until a predetermined velocity is reached, such that the rotation of the wheels causes the drive unit to rotate clockwise or counter-clockwise on an axis of rotation located at or near the center of the drive unit. Once the rotation velocity is reached, the drive unit may rotate at least 360 degrees, maintaining velocity for a period of time, and then decrease the velocity to zero.

During the constant velocity phase of the calibration routine, data from the gyroscope sensor and the wheel encoder sensor(s) are collected and analyzed. The drive unit applies a scale factor to one or both of the sensor outputs, such that the two angular velocity outputs agree within a predetermined tolerance. This calibration routine may improve the accuracy of the subsequent traction test routines and/or passive transaction monitoring.

The drive unit may also perform a test routine during the diagnostic mode of operation, which is comprised of a series of individual test runs. During this test routine, each of the wheels again may be turned clockwise or counter-clockwise so that the movement of the wheels spin the drive unit in a circular rotation at one location. For example, the drive unit may rotate in at least a 360-degree circle during the movement. Once the wheels accelerate to the predetermined velocity (e.g., according to the wheel encoders), the wheels may maintain the velocity for a period of time. The wheels may decelerate to zero velocity, concluding an individual test run. For each subsequent test run, the magnitude of the acceleration or deceleration may increase at a predefined increment as the test progresses. A slip magnitude may be identified during both acceleration and deceleration for each test run, and may be compared to a predetermined slip threshold value. The predetermined slip threshold value may be derived from a functional loss of traction. The slip point that is measured through the test routine may correspond with a violation of the slip threshold (e.g. the measured slip magnitude of a specific test run exceeds the predetermined slip threshold).

The accelerations and velocities used in the test routine may differ from the calibration routine. For example, during the test routine, the rotation of the drive unit relative to the surface may comprise a plurality of incrementally increased accelerations, each acceleration being greater than the previous test run. As a non-limiting example, the predetermined initial acceleration value may correspond with one radians per second squared and the predetermined maximum acceleration may correspond with ten radians per second squared. These values are intended to provide illustrations and not limit the disclosure herein.

When the drive unit accelerates and decelerates in each test run, the gyroscope sensor may record rotation gyroscope data (e.g., sensor data) identifying the angular velocity at any moment in time (e.g., in a data log or data store) and, in some examples, the rotation at the angular velocity may be maintained at a constant rate for a period of time. The wheel encoder sensor may also record data corresponding with the acceleration (e.g., in the data log or data store), but in a measurement of distance or position of the wheels of the drive unit.

In continuation with the test routine, the test routine may instruct the drive unit to accelerate the angular velocity of the wheels of the drive unit. In some examples, the increased angular acceleration may correspond with an additional predetermined acceleration value than the prior test runs. Again, the gyroscope sensor and the wheel encoder sensor may also record data corresponding with the acceleration and achieved angular velocity (e.g., in the data log or data store).

In some examples, once the drive unit has achieved the predetermined acceleration value for each portion of the test routine and recorded the data corresponding with a plurality of sensors, the drive unit may decrease the angular velocity to zero. This may ensure that the start of each test run corresponds with zero velocity that is increased by a predetermined acceleration value, so that any slip is properly attributed to an absolute value of the acceleration.

The test routine may comprise drive unit rotation in a clockwise or counterclockwise direction. In some examples, the entire calibration routine or test routine may be performed in a clockwise direction rather than a counterclockwise direction. Other modifications to the calibration routine or test routine may be implemented without diverting from the scope of the disclosure.

After one or more test runs, data may be compared and analyzed to determine whether the two sources of data continue to correspond with each other, as they did in the calibration routine. The two sources may correspond with each other when the wheels of the drive unit maintain contact and traction with the surface throughout the acceleration and/or deceleration, which may comprise desired rolling conditions between the wheels and the surface. The two sources may not correspond with each other when the wheels slip at any point during the test routine. In some examples, this may happen at the beginning or end of each test run (e.g., when the drive unit is accelerating or decelerating). The wheels of the drive unit may briefly lose contact with the surface due to low traction or grip of the surface. For example, when the wheels of the drive unit slip, the gyroscope sensor may identify that the angular velocity should place the wheels at location A, when the wheel encoder sensor may identify the distance or position of the wheels is at location B. In some examples, this slip magnitude (e.g., location A and B) may be measured in radians. Any difference between data from the two sensors may be identified as a loss of traction at the location where the test procedure is being performed.

The data may be recorded. Sample data are provided with FIGS. 6 and 7 of the disclosure. The data may be analyzed locally at the drive unit or may be transmitted to a management module of an inventory management system for analysis.

The test routine may determine a slip point, which may correspond with an acceleration or deceleration value that results in a slip magnitude above an acceptable slip threshold value. Using the acceleration or deceleration value that produced the slip point and a known weight distribution of the drive unit, a functional coefficient of friction may be determined between the drive unit and the floor.

In some examples, the determination of the acceleration threshold and the known weight distribution of the drive unit can be used to derive the coefficient of friction (O. For example, an acceleration threshold may correlate with the coefficient of friction of the surface where the test is performed. The acceleration threshold may be derived from a difference between the wheel encoder data and the rotation gyroscope data (e.g., sensor data). The acceleration threshold may also correspond with a particular time that the test was conducted so that multiple, different acceleration thresholds may be derived over time according to the changing traction states with the surface (e.g., dirty or contaminated floors, the wear and tear associated with floors, etc.). Additional actions may be performed in response to the derivation of the acceleration threshold as well.

In some examples, the determination of the acceleration threshold may be performed passively during a normal operation of the drive unit. For example, the drive unit may initiate a turn as part of retrieving or moving an item (e.g., unrelated to a calibration or test routine). In some examples, the normal operation of the drive unit may initiate a turn as part of moving over a surface to access a particular location or conduct a mission (e.g., to retrieve an inventory holder, to access a charger, etc.), where the operation is irrespective of moving an item. This operation may include accelerating and decelerating, similar to an individual test run in the previously described test routine. The management module may compare the encoder data and rotation gyroscope data to determine if the predetermined slip threshold has been exceeded. Identification of this slip point may be used to adjust or limit the angular acceleration threshold for the drive unit and/or the acceleration thresholds for other devices in a similar location where the slip threshold was exceeded.

The passive traction measurement may include, for example, receiving an instruction to obtain an item or inventory holder from an inventory station and accelerating to an inventory station location. The sensor data associated with accelerating the drive unit to access the inventory station and/or move and item to/from the inventory station may be stored and analyzed to identify whether a slip threshold has been exceeded. The drive unit may transmit a notification to identify the slip point or internally adjust a future acceleration threshold of the drive unit, based at least in part on the slip threshold being exceeded.

In some examples, one or more drive units may be instructed to reduce acceleration or deceleration in a particular area or completely avoid an area, based at least in part on the acceleration threshold that represents the slip value of the particular area. As a sample illustration, a plurality of drive units may be restricted to angular accelerations below five radians per second squared in a particular area based at least in part on the acceleration threshold for that area. In another example, a particular drive unit may be restricted to accelerating to four radians per second squared across all areas of the surface based at least in part on the health of the wheels or at the casters associated with that drive unit. In another example, a drive unit that is carrying an inventory holder (e.g., illustrated with FIG. 5) may be permitted to accelerate at a rate greater than five radians per second squared, due to the increased weight (and thereby traction) that is expected between the wheels of the drive unit and the surface.

The restrictions on acceleration or deceleration in a particular area may be transmitted to the drive units using a second instruction with the modified acceleration or deceleration from the management module of the inventory management system. In some examples, the restrictions on acceleration or deceleration may be adjusted locally to the drive unit so that any instructions received from the management module of the inventory management system may be adjusted to comply with the restrictions on acceleration or deceleration of the drive unit.

The additional action in response to the derivation of the acceleration threshold may alternatively correspond with maintenance of the drive unit. For example, a first drive unit and a second drive unit may perform the calibration routine and the test routine at a particular area, but record different data for the same location, which may result in an acceleration threshold difference between the first drive unit and the second drive unit for the same location.

The differences in data may correspond with features of each drive unit in addition to the surface of the floor. For example, debris may have become embedded in wheels of the drive unit or a castor of the wheel of either drive unit may be faulty (e.g., related to overuse of the wheels or other forces that require additional traction to conduct maneuvers of the drive unit). The drive unit may be instructed to access a maintenance location of the surface based on the acceleration threshold difference. The maintenance location may be configured to remediate the issues with the drive unit by, for example, removing debris that has become embedded in the wheels of the drive unit (e.g., cleaning the wheels) or fixing/replacing the castor of the wheel to remediate the castor problem.

In some examples, the traction problems may be caused by dirty or contaminated floors, the wear and tear customarily associated with floors, debris that has become embedded in wheels of the drive unit, or castor issues related to overuse of the wheels or other forces that require additional traction to conduct maneuvers of the drive unit.

In some examples, a heat map may be generated based at least in part on the acceleration thresholds corresponding with particular areas of the surface. The heat map may comprise, for example, a floor wide traction assessment that may be amended and adjusted for different points of time. The heat map may identify underperforming areas of the floor, allowing one or more human users to target particularly poor traction areas for immediate cleaning. A sample heat map and description of additional embodiments associated with the heat map are provided with at least FIG. 8.

Technical improvements to conventional systems are realized through embodiments described in the disclosure. For example, a conventional system may implement a floor friction meter that measures repeatable friction values for a particular area. However, the floor friction meter may not account for rolling wheels of drive units, a stationary surface that becomes dirtier over time, or acceleration of the drive units where the acceleration threshold may change through repeated wear and tear. In some embodiments of the disclosure, the drive units may be used to identify the acceleration threshold for particular areas that may result in a loss of traction for that area. By identifying a loss of traction for a particular area, the acceleration or deceleration value of a drive unit of that area may be limited or a heat map may be generated that assesses the traction of the area. This may help reduce or eliminate traction related problems on that surface, including causing the drive unit to slip from or miss an intended location (e.g., fiducial) or collide with another drive unit at a different location than what was intended.

Figure 2:
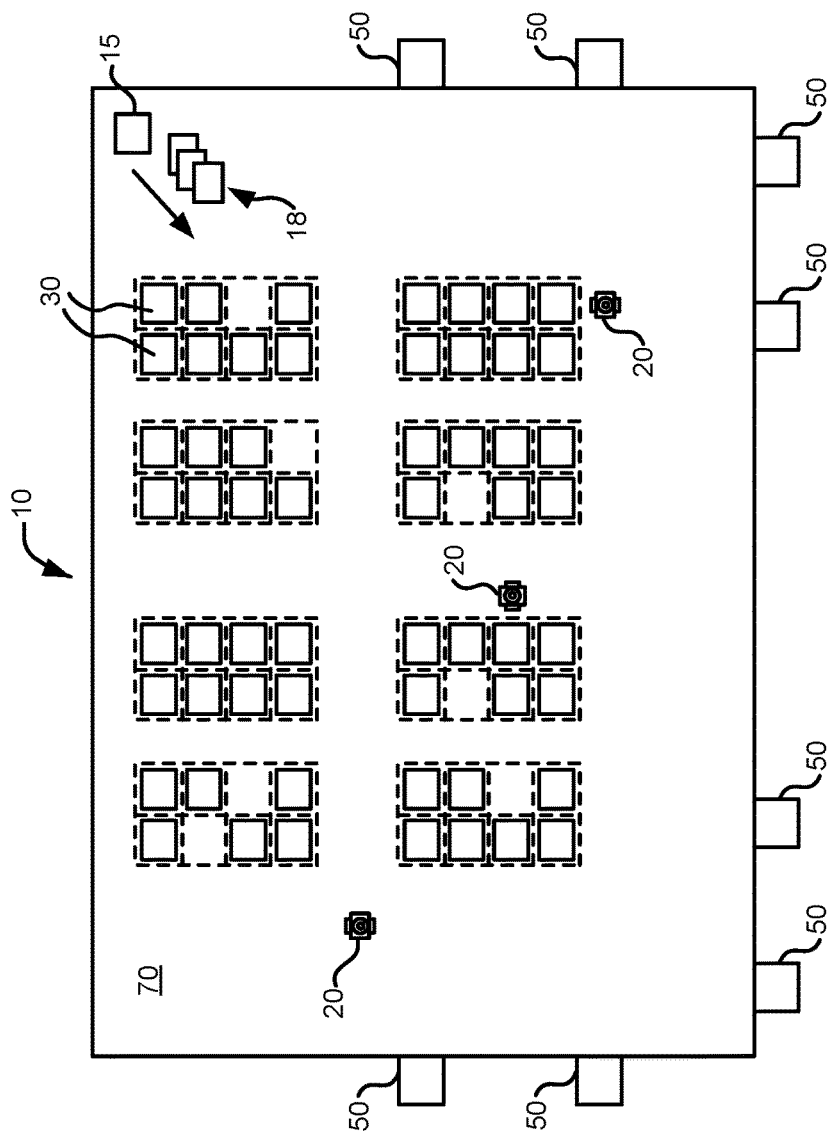
FIG. 2 illustrates components of an inventory system according to a particular embodiment.

FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate to the movement and processing of inventory items, and to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

In some examples, the inventory stations 50 or other area of workspace 70 may comprise one or more maintenance locations. For example, the management module 15 may instruct a particular mobile drive unit 20 to access a maintenance location at an inventory station 50 upon a determination that the wheel encoder data or rotation gyroscope data for the mobile drive unit is not attributable to the health of the surface, but rather the status of the wheels or casters of the mobile drive unit. The maintenance location may be equipped with replacement parts for the mobile drive units 20 or additional diagnostic equipment to further assess and fix the problems.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the system throughput of inventory system 10 and/or provide other operational benefits.

Figure 3:
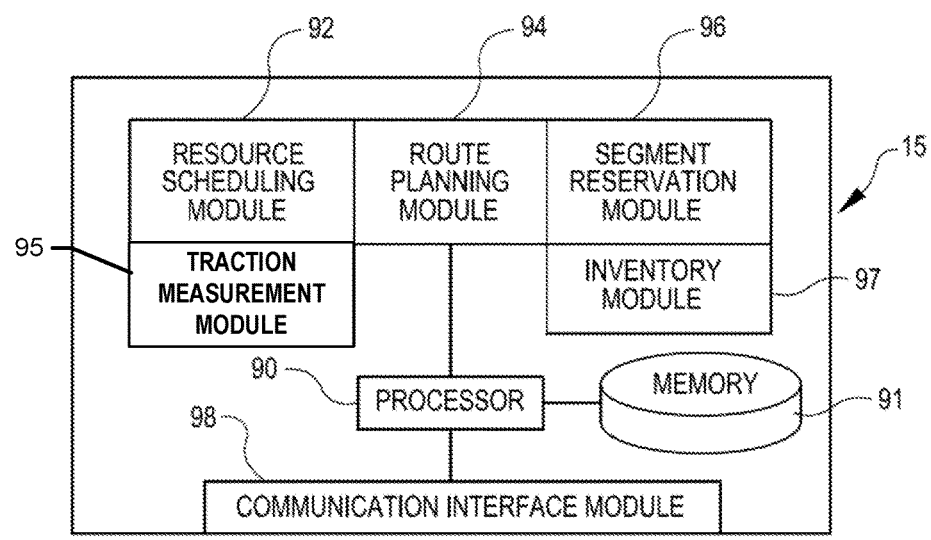
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a traction measurement module 95, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Traction measurement module 95 receives a plurality of data from mobile drive units 20 or other sources to determine the traction of a surface, including workspace 70, outdoors, within a vehicle (such as a cargo ship), or otherwise unconstrained by any fixed structure. Data received by traction measurement module 95 may comprise wheel encoder data, rotation gyroscope data, or other sensor data from one or more mobile drive units. Traction measurement module 95 may analyze and compare the data to determine additional measurements, including a acceleration threshold based at least in part on a difference between these data. After determining a acceleration threshold for a surface, traction measurement module 95 may transmit additional instructions to the mobile drive units 20 to adjust acceleration or deceleration when the mobile drive unit interacts with the surface. In some examples, after determining the acceleration threshold for a surface, traction measurement module 95 may receive additional data and combine the data to generate a heat map of traction measurements across multiple surfaces in workspace 70.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

Inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, traction measurement module 95, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, traction measurement module 95, segment reservation module 96, inventory module 97, and communication interface module 98 may represent components physically separate from the remaining elements of management module 15. Moreover, any two or more of resource scheduling module 92, route planning module 94, traction measurement module 95, segment reservation module 96, inventory module 97, and communication interface module 98 may share common components. For example, in particular embodiments, resource scheduling module 92, route planning module 94, traction measurement module 95, segment reservation module 96, and inventory module 97 represent computer processes executing on processor 90 and communication interface module 98 comprises a wireless transmitter, a wireless receiver, and a related computer process executing on processor 90.

FIG. 4 illustrates in greater detail the components of a particular embodiment of mobile drive unit 20. In particular, FIG. 4 includes a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIG. 4 illustrates a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30 or help determine an acceleration threshold of a surface that may be used to measure the traction of the surface.

Figure 5:
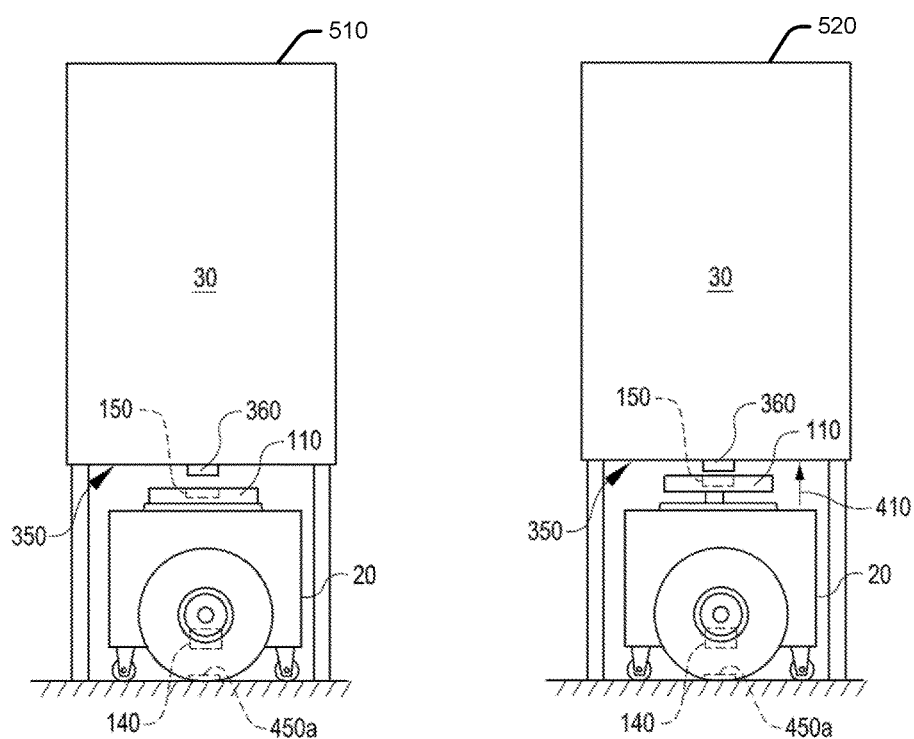
FIG. 5 illustrate an operation of the mobile drive unit and the inventory holder during docking and undocking.

FIG. 5 illustrates an interaction between mobile drive unit 20 and inventory holder 30. For example, illustration 510 is an example of mobile drive unit 20 and inventory holder 30 prior to docking and illustration 520 is an example of mobile drive unit 20 and inventory holder 30 prior to docking. As noted above with respect to FIG. 2, mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30. In some examples, the acceleration threshold may vary based at least in part on whether mobile drive unit 20 and inventory holder 30 are docked or not docked, which may adjust the weight of mobile drive unit 20 with respect to the surface.

In particular, illustration 510 shows mobile drive unit 20 may engage with inventory holder 30 as mobile drive unit 20 approaches the storage location identified by the received command. In the illustrated embodiment, the reference point is marked by fiducial mark 450A which comprises a surface operable to reflect light and which, as a result, can be detected by particular embodiments of position sensor 140 when mobile drive unit 20 is positioned over or approximately over fiducial mark 450A. As noted above, the illustrated embodiment of mobile drive unit 20 utilizes optical sensors, including a camera and appropriate image- and/or video processing components, to detect fiducial marks 450.

Illustration 520 shows the operation of mobile drive unit 20 in docking with inventory holder 30. After positioning itself over fiducial mark 450A, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

After engaging with inventory holder 30, mobile drive unit 20 is capable of inducing translational and/or rotational movement in inventory holder 30 while mobile drive unit 20 is docked with inventory holder 30. For example, in the illustrated embodiment, inventory holder 30 is supported by mobile drive unit 20 while the two components are docked and mobile drive unit 20 is capable of inducing translational and/or rotational movement in inventory holder 30 by moving or rotating itself or some sub-component of itself, such as docking head 110. As a result, while mobile drive unit 20 and inventory holder 30 are docked mobile drive unit 20 may move inventory holder 30 to a requested destination based on commands received by mobile drive unit 20, as suggested by arrow 420.

In some examples, the rotation of mobile drive unit 20 to determine the acceleration threshold for a particular surface in the warehouse 70 may be performed in a diagnostic mode of mobile drive unit 20 (e.g., comprising a calibration process and/or a testing process) and the movement of the inventory holder 30 to the requested destination may be performed in a normal mode of operation. The diagnostic mode may help determine the traction of the surface so that any movement or operation on the surface during the normal mode of operation is altered based at least in part on the diagnostic mode and derivation of the acceleration threshold. The normal mode of operation may allow mobile drive unit 20 to perform a movement of an item and/or inventory holder 30 over the surface. In some examples, the movement of the item and/or inventory holder 30 over the surface may be based on the analysis conducted during the diagnostic mode of operation.

Figure 6:
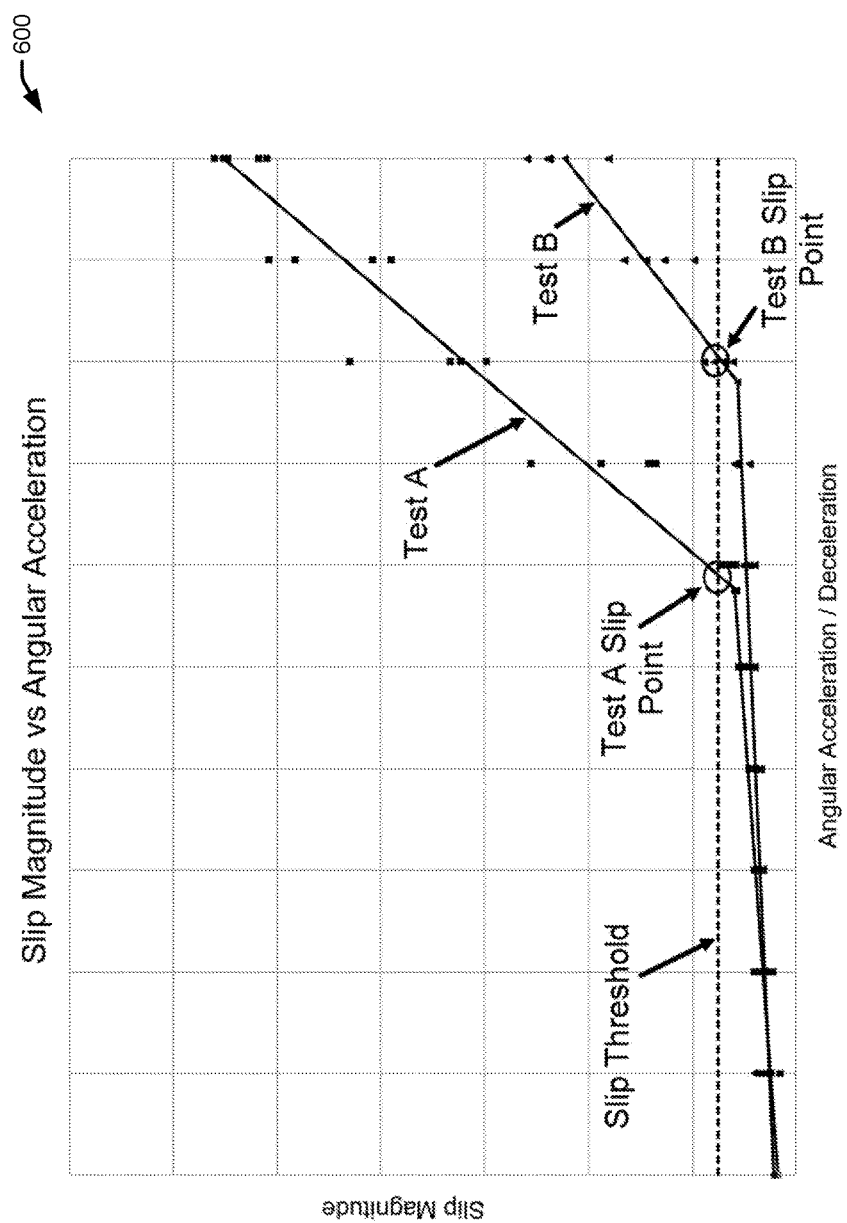
FIG. 6 illustrates data for determining a slip point in response to test data according to an embodiment of the present disclosure.

FIG. 6 illustrates data for determining a slip point in response to test data according to an embodiment of the present disclosure. In illustration 600, a line in the illustration may represent wheel encoder data and the rotation gyroscope data corresponding with a single drive unit. There may be two total drive units that provide data for illustration 600, where the data correspond with the wheel encoder data and the rotation gyroscope data collected by the individual drive units.

The drive units may transmit the angular acceleration, which is measured in radians per second squared, with respect to the slip magnitude, which is measured in radians. The illustration shows that at a low angular acceleration, the slip magnitude is also low. Once the data corresponding with the slip magnitude and the angular acceleration or deceleration has passed a slip threshold, a slip point may be identified in the data. The slip magnitude may increase as the absolute value of the angle acceleration or deceleration also increases.

Illustration 600 also provides a bilinear correlation between the slip magnitude and the angular acceleration. For example, the first linear correlation between the slip magnitude and the angular acceleration may correspond with a slope at a first value and the second linear correlation between the slip magnitude and the angular acceleration may correspond with a slope at a second value. Once the linear correlation converts from the first slope to the second slope, there does not appear to be an acceleration rate that can overcome the slip magnitude at the higher acceleration. This may translate to an instruction to limit the acceleration or deceleration of the corresponding drive unit, so that the angular acceleration corresponds with the first linear correlation of illustration 600 (below the slip threshold) and not the second linear correlation of illustration 600 (above the slip threshold).

As a sample illustration, at one unit of angular acceleration, the slip magnitude is 0.007 radians which is a fraction of one degree. When the slip threshold is 0.01 radians, the slip magnitude for the angular acceleration at this rate does not exceed the slip threshold and the acceleration rate is acceptable. In another example, at a six or seven radians per second squared (rad/s/s) angular acceleration, the magnitude exceeds the slip threshold and approaches 0.02 radians. The acceleration rate, in some examples, maybe unacceptable based at least in part on the slip magnitude when compared with the slip threshold. These values are provided for illustrative purposes and should not limit the disclosure provided herein.

FIG. 7 illustrates wheel encoder data and/or rotation gyroscope data according to an embodiment of the present disclosure. For example, illustration 600 of FIG. 6 may be generated from the data similar to illustration 700 of FIG. 7. For example, in illustration 700, the first row of data may correspond with the first test. The first test may identify an acceleration of one radian per second squared, velocity of 2.6, and the slip magnitude of 0.006 radians. In some examples, the data are negative or positive values, which corresponds with counter-clockwise and clockwise directions, respectively. Multiple test runs may be conducted to determine a bilinear correlation, as illustrated in FIG. 6.

In illustration 700, the acceleration may be incrementally increased at a rate of the predetermined acceleration value to help identify a slip point associated with a slip threshold. For example, at test run ten, the acceleration value corresponds with five radians per second squared. At test run eleven, deceleration value corresponds with six radians per second squared. The slip magnitude corresponding with these two test runs also increases, from 0.010 to 0.011. When the slip threshold is set at 0.01, the acceleration value corresponding with test run ten may identify an acceleration threshold that does not exceed the slip threshold. However, the acceleration value corresponding with test run eleven may identify an acceleration threshold that does exceed the slip threshold.

Figure 8:
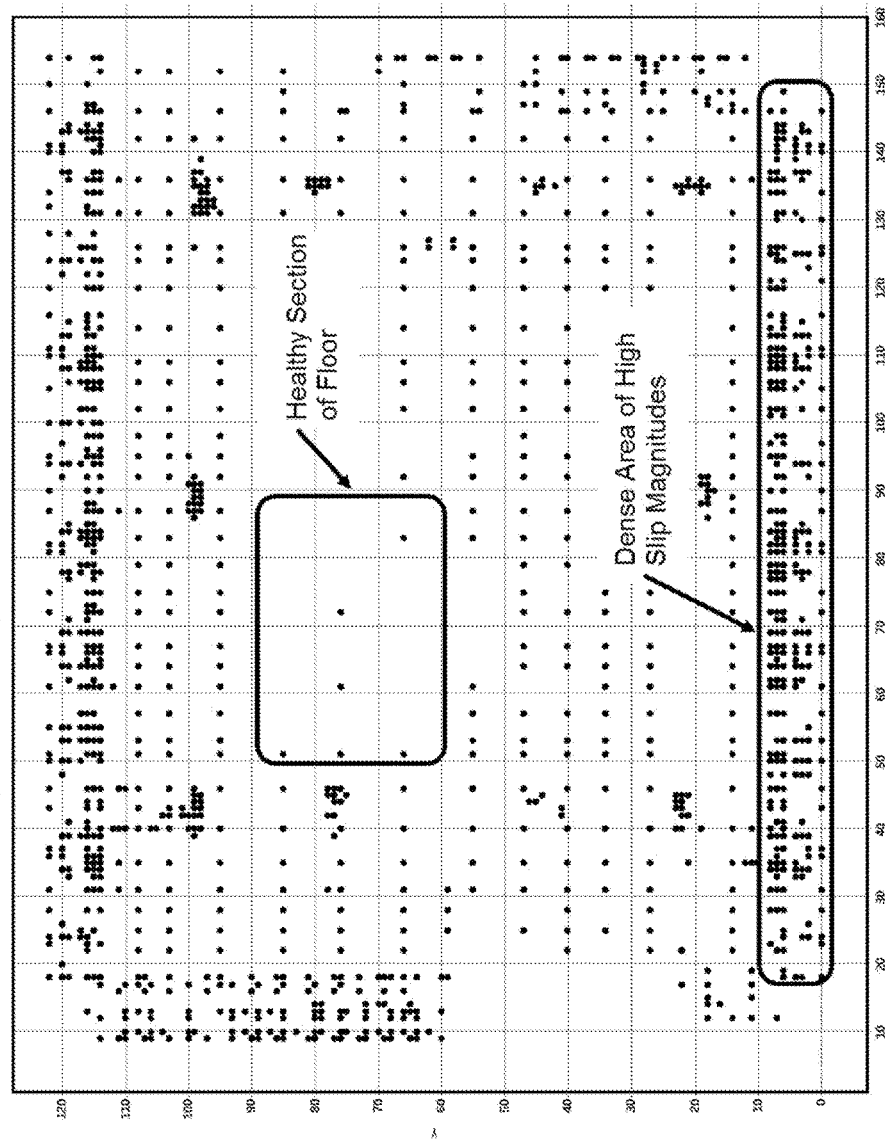
FIG. 8 illustrates an example heat map according to an embodiment of the present disclosure.

FIG. 8 illustrates an example heat map according to an embodiment of the present disclosure. In illustration 800, a heat map is provided that illustrates one or more slip points across a surface. The slip points may correspond with a location on the surface where one or more mobile drive units have accelerated and the data (e.g., the comparison of rotation angle via the encoder and rotation angle via the rotation gyroscope, etc.) corresponding with the drive unit that has exceeded the slip threshold for the system.

Floor traction measurements may also be requested by a user and stored with the heat map. Upon request, a drive unit may access the location, perform the calibration and test routines, and transmit the traction data to update the heat map. The on-demand traction inspection may allow users to pinpoint traction areas where suspected traction issues exist.

The heat map may identify temporary contaminants on the surface. This may comprise, for example, a liquid spill that covers a portion of the surface or a particularly dusty area. Based at least in part on the heat map that identifies the temporary contaminants on surface, instructions may be generated to the drive units to avoid the temporary contaminants and reroute to other areas. In some examples, drive units that have accessed the area may be routed to a maintenance location for cleanup. This routing or rerouting process may also further reduce the spread of the spill via the drive units tracking the temporary contaminants along the surface.

The heat map may also identify permanent wear and tear of the surface. This may comprise, for example, a tear or a hole in the surface. Based at least in part on the identification of the permanent wear and tear of the surface, the drive units may be instructed to avoid the area completely until the permanent wear and tear of the surface is fixed.

In some examples, the heat map may identify portions of the surface to reduce acceleration or deceleration, or completely avoid, based at least in part on the derived acceleration threshold for the surface. For example, the heat map may be based on a slip threshold (e.g., as 0.01 radians or other predetermined slip threshold) and the acceleration of the drive unit may be limited based at least in part on the slip threshold. The heat map may identify the expected slip magnitude versus angular acceleration for the surface. When any portion of the heat map identifies unexpected loss of traction may result in this slip, the drive unit may avoid the area identified by the heat map.

The heat map may be updated with additional information from other drive units. For example, a plurality of drive units may transmit wheel encoder data and rotation gyroscope data from the individual drive units to a management module associated with the inventory management system. The heat map may comprise a combination of data from the plurality of drive units. In some examples, an average or combined acceleration threshold may be identified for surface, based at least in part to account for structural differences between the drive units (e.g., maintenance issues, etc.).

Figure 9:
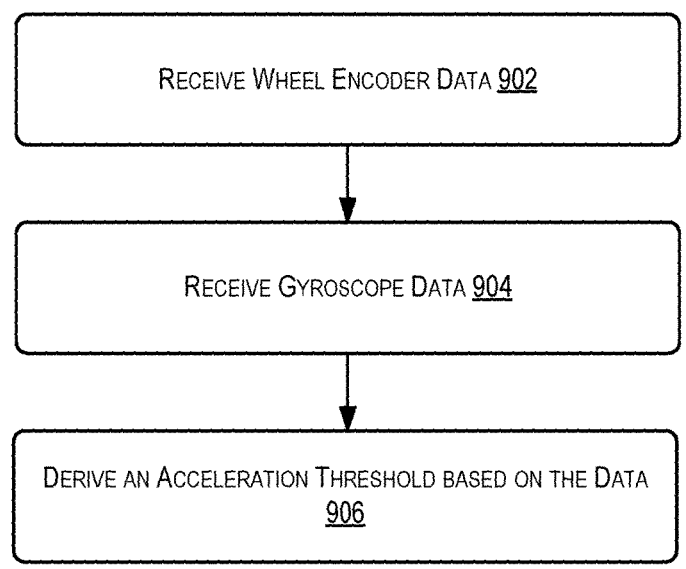
FIG. 9 illustrates a sample process of measuring traction of a surface using a mobile drive unit according to an embodiment of the present disclosure.

FIG. 9 illustrates a sample process of measuring traction of a surface using a mobile drive unit according to an embodiment of the present disclosure. In some examples, the management module or the mobile drive unit(s) may perform the process 900 of FIG. 9.

Some or all of the process 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 900 may begin at 902 by receiving wheel encoder data. For example, management module 15 may receive a transmission of wheel encoder data from one or more mobile drive units 20. In another example, the one or more mobile drive units 20 may receive wheel encoder data directly from a wheel encoder sensor that is located locally at the mobile drive unit.

At 904, rotation gyroscope data may be received. For example, management module 15 may receive a transmission of rotation gyroscope data from one or more mobile drive units 20. In another example, the one or more mobile drive units 20 may receive rotation gyroscope data directly from a gyroscope sensor that is located locally at the mobile drive unit.

At 906, an acceleration threshold may be derived based on the data. For example, management module 15 or the one or more mobile drive units 20 may derive the acceleration threshold. The acceleration threshold may be derived based at least in part on a difference between the wheel encoder data and the rotation gyroscope data, as described throughout the disclosure.

Figure 10:
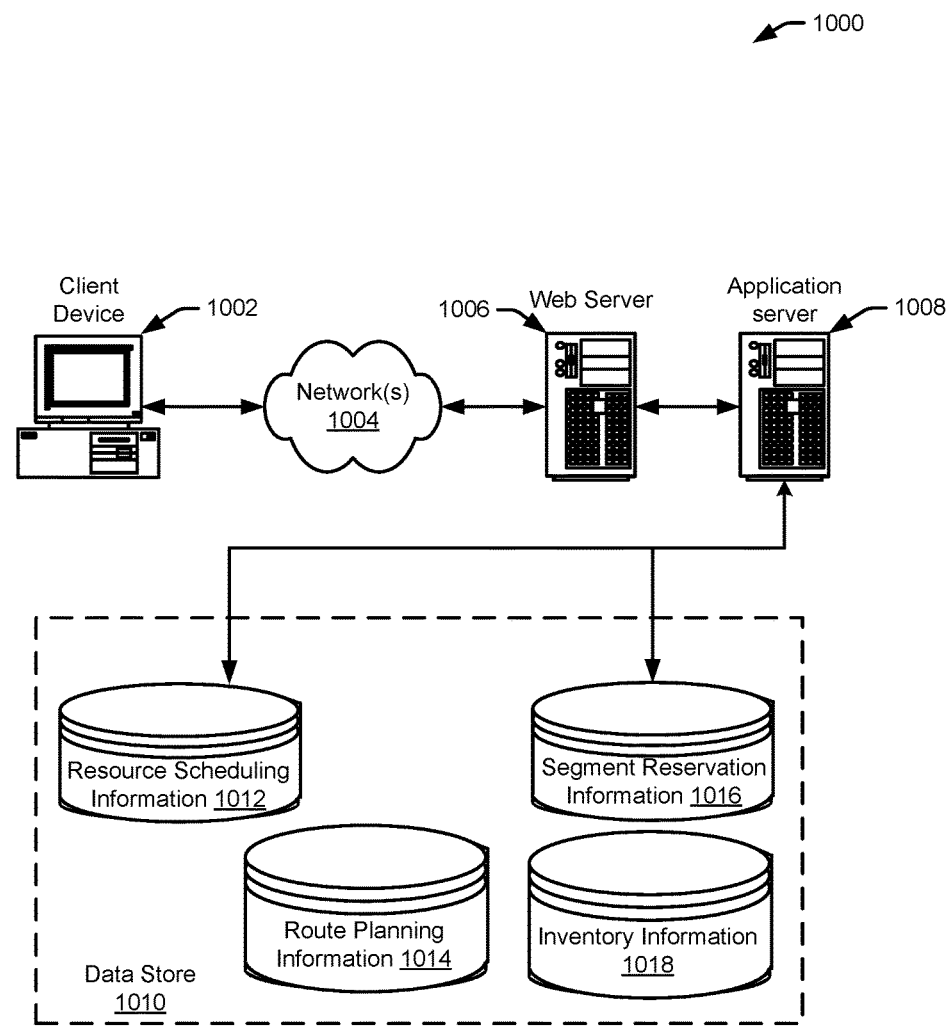
FIG. 10 illustrates an environment in which various features of the inventory system can be implemented, in accordance with at least one embodiment.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing information which can be used by modules described herein, such as resource scheduling information 1012, route planning information 1014, segment reservation information 1016, and/or inventory information 1018. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
   an unmanned mobile drive unit, the unmanned mobile drive unit configured to move a container holder across a surface in a storage facility; and
   a management module configured to:
      transmit an instruction to the unmanned mobile drive unit to perform a rotation relative to the surface, the instruction comprising accelerating or decelerating the rotation of the unmanned mobile drive unit relative to the surface;
      receive wheel encoder data from the unmanned mobile drive unit, the wheel encoder data generated based at least in part on the rotation;
      receive rotation gyroscope data from a gyroscope sensor of the unmanned mobile drive unit;
      compare the wheel encoder data from the rotation with the rotation gyroscope data;
      determine a difference between the wheel encoder data and the rotation gyroscope data, the difference between the wheel encoder data and the rotation gyroscope data corresponding with a slip value;
      derive an acceleration threshold that limits the slip value to being below a slip threshold; and
      instruct the unmanned mobile drive unit to modify the acceleration or deceleration of the unmanned mobile drive unit based at least in part on the acceleration threshold of the surface.

2. The inventory management system of claim 1, wherein the instruction to perform the rotation relative to the surface follows a calibration routine that syncs wheel encoder outputs with rotation gyroscope outputs to within a predetermined tolerance.

3. The inventory management system of claim 1, wherein wheels of the unmanned mobile drive unit rotate to move the unmanned mobile drive unit at least 360 degrees.

4. The inventory management system of claim 1, where the rotation comprises a plurality of incrementally increasing accelerations and a plurality of incrementally increasing decelerations.

5. A computer-implemented method for measuring traction of a surface using a mobile drive unit, the method comprising:
   instructing the mobile drive unit to perform a rotation relative to the surface, the instruction comprising accelerating or decelerating the rotation relative to the surface;

receiving wheel encoder data from the mobile drive unit, the wheel encoder data generated based at least in part on the rotation;

receiving sensor data from the mobile drive unit;

comparing the wheel encoder data from the rotation with sensor data of the mobile drive unit;

determining a difference between the wheel encoder data and the sensor data, the difference between the wheel encoder data and the sensor data corresponding with a slip value; and deriving an acceleration threshold that limits the slip value being below a slip threshold.

6. The computer-implemented method of claim 5, further comprising:

modifying acceleration or deceleration of the rotation of the mobile drive unit based at least in part on the acceleration threshold; and transmitting a second instruction with the modified acceleration or deceleration to the mobile drive unit.

7. The computer-implemented method of claim 5, further comprising:

generating a heat map based at least in part on the acceleration threshold.

8. The computer-implemented method of claim 7, wherein the heat map identifies temporary contaminants on the surface.

9. The computer-implemented method of claim 7, wherein the heat map identifies permanent wear and tear of the surface.

10. The computer-implemented method of claim 7, further comprising:

receiving additional data from the mobile drive unit; and updating the heat map based at least in part on the additional data.

11. The computer-implemented method of claim 7, wherein movement of the mobile drive unit is restricted away from a location identified by the heat map.

12. The computer-implemented method of claim 5, further determining an association between the difference between the wheel encoder data and the sensor data that is associated with a value of acceleration or deceleration of the mobile drive unit.

13. The computer-implemented method of claim 5, further comprising:

instructing the mobile drive unit to enter a diagnostic mode, wherein the rotation is performed in the diagnostic mode; and instructing the mobile drive unit to enter a normal mode, wherein the normal mode allows the mobile drive unit to perform a movement over the surface, and wherein the movement over the surface is based at least in part on the acceleration threshold.

14. The computer-implemented method of claim 5, wherein the mobile drive unit is a first mobile drive unit and the method further comprises:

receiving a second acceleration threshold from a second mobile drive unit;

determining an acceleration threshold difference between the first mobile drive unit and the second mobile drive unit; and instructing the second mobile drive unit to access a maintenance location of the surface based at least in part on the acceleration threshold difference.

15. The computer-implemented method of claim 14, wherein the acceleration threshold difference is based at least in part on a castor problem of the second mobile drive unit and the maintenance location is configured to remediate the castor problem.

16. A management module for controlling a mobile drive unit, the management module comprising:

a memory configured to store computer-executable instructions; and a processor configured to access the memory and execute the computer-executable instructions to cause the management module to at least:

receive wheel encoder data from the mobile drive unit, the wheel encoder data generated based at least in part on the mobile drive unit rotating relative to a surface, and accelerating or decelerating rotation relative to the surface;

receive sensor data from the mobile drive unit;

compare the wheel encoder data from the rotation with sensor data of the mobile drive unit to determine a slip value; and derive an acceleration threshold that limits the slip value being below a slip threshold.

17. The management module of claim 16, wherein the computer-executable instructions further cause the management module to receive the wheel encoder data and the sensor data from the mobile drive unit and derive the acceleration threshold from the wheel encoder data and the sensor data.

18. The management module of claim 16, wherein the computer-executable instructions further cause the management module to instruct the mobile drive unit to calibrate the wheel encoder data and the sensor data by spinning at a constant rate.

19. The management module of claim 16, wherein the mobile drive unit is further configured to move an inventory holder, wherein the acceleration threshold changes based at least in part on a weight of the inventory holder.

20. The management module of claim 16, wherein the slip threshold is a predetermined slip threshold and acceleration of the mobile drive unit is limited based at least in part on the slip threshold.

* * * * *